United States Patent [19]
Becher et al.

[11] 3,806,589
[45] Apr. 23, 1974

[54] PROCESS FOR REGENERATION OF ANTIMONY HALIDE CATALYSTS

[75] Inventors: Wilfried Becher, Anderten; Joachi Massonne; Wilhelm Pohlmeyer, both of Hannover, all of Germany

[73] Assignee: Kali-Chemie Aktiengesellschaft, Hannover, Germany

[22] Filed: Aug. 7, 1972

[21] Appl. No.: 278,650

[30] Foreign Application Priority Data
Aug. 11, 1971 Germany.................................. 2140188

[52] U.S. Cl.................. 423/491, 252/413, 252/415, 260/653.7, 260/653.8, 423/87, 423/88
[51] Int. Cl......................... C01b 29/00, B01j 11/80
[58] Field of Search...... 252/413, 415, 412; 423/87, 423/491, 88; 260/653.7, 653.8

[56] References Cited
UNITED STATES PATENTS

| | | | |
|---|---|---|---|
| 2,786,738 | 3/1957 | Ruh et al. | 423/87 |
| 2,927,948 | 3/1960 | Sherer et al. | 260/653.7 |
| 2,870,224 | 1/1959 | Sherer et al. | 260/653.7 |
| 2,549,988 | 4/1951 | Perkins | 260/653.7 |

Primary Examiner—Daniel E. Wyn
Assistant Examiner—P. E. Konopka
Attorney, Agent, or Firm—Michael S. Striker

[57] ABSTRACT

Spent antimony halide catalysts resulting from the fluorination of chlorinated hydrocarbons and containing in the spent condition a mixture of antimony (III)- and antimony (V)-halides are regenerated by a. dissolving the spent catalyst in water to form an aqueous acidic solution thereof;

b. adding a concentrated solution of ammonia to said aqueous solution until the solution is slightly alkaline and maintaining the solution at the resulting increased temperature until the antimony oxides are precipitated from the solution, forming a suspension therein;

c. filtering off the precipitate;

d. dissolving the precipitate in concentrated hydrochloric acid;

e. introducing sulfurous acid, a salt thereof or sodium thiosulfate into the said solution, while adding a redox catalyst in case of sulfurous acid or salt thereof, so as to cause reduction of the antimony (V)-chloride present in said mixture of antimony chlorides to antimony (III)-chloride;

f. adding a concentrated aqueous ammonia solution to the hydrochloric acid solution to precipitate the antimony compound in the form of antimony (III)-oxide or antimony (III)-oxychloride;

g. separating the web precipitate from the solution;

h. dissolving it in concentrated hydrochloric acid, and i. subjecting the hydrochloric acid solution to fractional distillation to obtain antimony (III)-chloride which can be used as fresh catalyst in the above fluorination reaction.

If the fluorine ion contents of the spent catalyst is not in excess of 1 percent, the reduction may be performed directly with the aqueous acidic solution of the catalyst without alkalizing the solution with ammonia solution and dissolving the precipitate in hydrochloric acid.

11 Claims, No Drawings

PROCESS FOR REGENERATION OF ANTIMONY HALIDE CATALYSTS

BACKGROUND OF THE INVENTION

The invention relates to a regeneration of spent antimony halide catalysts, such as results from the fluorination of chlorinated hydrocarbons by catalytic reaction with hydrogen fluoride.

Fluorinated chlorohydrocarbons and fluoro hydrocarbons, particularly those of one to two carbon atoms, are used on a large scale in the solvents, refrigerants, and aerosols industries. To make these products on an industrial scale the exchange of chlorine for fluorine is normally effected by reacting chlorine containing starting products with hydrogen fluoride while employing antimony halides as catalysts. The catalysts in these cases are partially fluorinated antimony (V)-chlorides. The degree of fluorination in the individual processes varies within a broad range. These catalysts are either made prior to the fluorination reaction itself, by treating antimony (V)-chloride with hydrogen fluoride or are obtained in situ from antimony trichloride, chlorine and hydrogen fluoride as components.

Experience has shown that the lifetime of these catalysts is limited. On the one hand it depends on the type of reaction to be catalyzed and on the other hand it appears that the water contents of the reaction components is of importance since the water gradually and increasingly leads to the formation of inactive antimony oxyhalides. If the speed of reaction due to the decreasing activity goes below a certain limit, the catalyst must be removed from the reaction and must be replaced by a fresh catalyst.

The inactive catalysts which have been separated from the majority of the organic phase and which usually are also contaminated by adhering halogenated hydrocarbons or are kept in solution thereby, contains the antimony in its trivalent and pentavalent form as a mixture of chlorides and fluorides. The fluorine contents can vary in a broad range depending on the particular reaction which has been catalyzed. Corresponding oxyhalides of antimony may also be present in the mixture. The catalysts moreover are usually contaminated by heavy metal compounds, for instance, nickel-, chromium or iron halides which become incorporated in the catalysts due to corrosion occurring in the reactor.

The economy of the process makes it necessary to recover the antimony from the spent (inactive) catalysts in form of a compound which can again be used in the fluorination process. Heretofore, such regeneration process could not be designed because it was not possible to convert the antimony quantitatively into antimony (V)-chloride or antimony (III)-chloride and at the same time to achieve complete elimination of all contaminations.

The object of the invention is therefore a process which permits the almost quantitative recovery of the antimony from the spent catalysts in the form of antimony (III)-chloride which can again be used as catalyst in the fluorination reaction.

SUMMARY OF THE INVENTION

This object is accomplished by:

a. dissolving the spent catalyst in water to form an aqueous acidic solution thereof;

b. adding a concentrated solution of ammonia to said aqueous solution until the solution is slightly alkaline and maintaining the solution at the resulting increased temperature until the antimony oxides are precipitated from the solution, forming a suspension therein;

c. filtering off the precipitate;

d. dissolving the precipitate in concentrated hydrochloric acid;

e. introducing sulfurous acid, a salt thereof or sodium thiosulfate into the said solution, while adding a redox catalyst in case of sulfurous acid or salt thereof, so as to cause reduction of the antimony (V)-chloride present in said mixture of antimony chlorides to antimony (III)-chloride;

f. adding a concentrated aqueous ammonia solution to the hydrochloric acid solution to precipitate the antimony compound in the form of antimony (III)-oxide or antimony (III)-oxychloride;

g. separating the wet precipitate from the solution;

h. dissolving it in concentrated hydrochloric acid, and i. subjecting the hydrochloric acid solution to fractional distillation to obtain antimony (III)-chloride which can be used as fresh catalyst in the above fluorination reaction.

If the fluorine ion contents of the spent catalyst is not in excess of 1 percent, the reduction may be performed directly with the aqueous acidic solution of the catalyst without alkalizing the solution with ammonia solution and dissolving the precipitate in hydrochloric acid.

DETAILS OF THE INVENTION AND SPECIFIC EMBODIMENTS

The difficulty with the reduction of pentavalent antimony compounds to trivalent compounds on an industrial scale was the reason that the conventional inexpensive reducing agents cannot be used for this purpose. In the first place, for safety all reducing agents must be disregarded which may result in the formation of hydrogen and thus in the forming of the highly toxic antimony hydride. Electrolytic processes can likewise not be used since the electrolytic elimination of antimony from aqueous antimony chloride solutions results in the so-called "explosive antimony." The perhaps least expensive reducing agent of the chemical technology, sulfur dioxide, likewise fails because its reducing action is not sufficient to convert the pentavalent antimony ion completely to the trivalent ion.

The quantitative reduction of the pentavalent antimony to the trivalent antimony by sulfurous acid in the process of the invention is possible because a large part of the fluorine may be separated in a preliminary step and the subsequent reduction may be carried out, for instance, with sulfur dioxide in the presence of an iodide ions furnishing compound. An important basis for a successful quantitative reduction of $Sb(V)_+$-ion to $Sb(III)_+$-ion is a relatively low concentration of fluorides in the inactive antimony halide catalyst. Fluorine compounds of the pentavalent antimony are difficult to reduce. It has been found, however, that it is not necessary to remove the fluoride ion completely from the product to be reduced. It is sufficient if the concentrated acidic solution of the antimony halides which is obtained by dissolving the spent antimony halide catalyst in water is made slightly alkaline by reaction with concentrated ammonia solution. If desired, water insoluble organic residues which may be present, can be eliminated by mechanical separation prior to the reaction. The then formed hot suspension is digested for some time while stirring. By precipitation, there is then obtained a precipitate which may further be washed with warm water to eliminate adsorbed residual fluoride ions. The precipitate principally consists of a mixture of antimony (III)-oxide and antimony (V)-oxyhydrate and has only minor contents of fluorine. The precipitate can then be readily subjected to the reducing step of the invention. A further advantage of this process is that also the heavy metals are at least partially eliminated in the form of the corresponding ammonia compounds.

The reduction can also be effected directly in the aqueous solution of the inactive catalyst provided that the contents of fluoride ions in the spent catalyst is not above 1 percent.

To carry out the reduction of the antimony oxide the precipitate resulting from the reaction with the ammonia solution is dissolved in concentrated hydrochloric acid. Sulfurous acid is then introduced into the solution. Preferably this is done in the form of adding sulfur dioxide. It is, however, possible also to use the salts of the acid, such as alkali-metal sulfites and alkali-metal hydrogen sulfites.

A complete and rapid reduction is however possible in this case only if a suitable agent is added as catalyst for the redox reaction. Preferred for this purpose is the iodide ion. The addition may be made in the form of an iodine compound which is subject more or less to dissociation in aqueous solution, such as hydriodic acid or iodides, particularly alkali iodides.

Less than 0.01 percent of iodide ions relative to the solution are sufficient to provide for a rapid reduction if the solution is not too dilute. The lower limit for an adequate reduction speed is an iodide concentration of about 0.005 percent by weight.

During the reduction with sulfur dioxide a temperature increase takes place in the solution. To complete the reaction and at the same time to remove most of the excess sulfur dioxide the solution preferably is further heated for a while at boiling point.

The reduction of the pentavalent antimony can also be carried out with sodium thiosulfate. If this reducing agent is used, it is not necessary to have iodide ions present in the reaction. However, the solution must then be treated by heating at boiling point for a longer period so as to convert the colloidal sulfur to a form which can be filtered out and thus is removable prior to the next step.

Before subjecting the antimony (III)-chloride solution then to further processing in order to recover the solid antimony (III)-chloride the heavy metal ions and fluoride ions as well as the sulfate ions formed in the reduction reaction must be eliminated. This can be done by reacting the solution with a concentrated ammonia solution until the antimony in form of antimony (III)-oxide is completely precipitated whereupon the precipitate is filtered and washed with ammonium sulfite containing water. At a pH between about 8 and 9, most of the heavy metals which were still present can be removed and the pure antimony (III)-oxide can be recovered.

The separation of the antimony from undesirable by-products can also be effected at lower pH values (from about 1 to 2) where the oxychloride is recovered. However, this embodiment is less desirable because of the higher solubility of the oxychloride.

After dissolving the precipitate in concentrated hydrochloric acid, antimony (III)-chloride of high purity is obtained by fractional distillation. About 90 percent of the antimony is thus recovered as antimony (III)-chloride. An intermediate fraction occurring in the distillation and the final distillation residue may be recycled and subjected to further fractional distillation with additional antimony (III)-chloride solution. This will substantially improve the yield. If an undesirably high amount of contaminants is present in the distillation residue after repeated runs, it should be recycled into the preliminary reduction stage.

The process of the invention permits to recover up to 99 percent of the antimony which is present in the inactive catalyst. A further advantage is that in this way the pollution of the sewage water with antimony compounds is kept at a low level.

The invention is further illustrated by the following examples:

EXAMPLE 1

Four hundred ninety-three g of an inactive antimony halide catalyst were dissolved in a plastic vessel in 170 g water and subjected to filtration. The catalyst had the following composition: 164.3 g Sb(V), 74.8 g Sb(III), 73.9 g F, about 135 g Cl and about 1 g of heavy metals. The filtrate was slowly poured while stirring into 986 g of a 25 percent ammonia solution which had been placed in a glass flask with attached reflux condenser. A pH of about 8 developed. The temperature during the addition of the antimony halide solution rose to about 100° C. This temperature was then maintained for another 15 minutes. The suspension that formed was thereafter subjected to filtration with a suction filter and the antimony mixture left as residue was washed with 440 g of warm water to remove most of the fluorine.

The filter residue was then dissolved in 1,235 g of concentrated hydrochloric acid. The fluoride concentration of the solution was about 1 percent. After addition of 0.26 g potassium iodide, 90 g of sulfur dioxide were introduced within a period of 75 minutes causing the temperature to rise to slightly above 50° C. Heating was then continued to a temperature of 110° C to complete the reaction and at the same time, to eliminate most of the excess sulfur dioxide.

The solution was thereafter reacted while cooling with a 25 percent ammonia solution until a pH of about 8 had been reached. The amount used in this step was 1,025 g.

After filtration by means of a suction filter and washing with 300 g water containing a small amount of sulfur dioxide and ammonia, a filtration residue in the form of antimony (III)-oxide of high purity was isolated. Its Sb(III)-contents was 233.1 g. The yield was 97.5 percent.

To effect the conversion to antimony (III)-chloride the still moist oxide was dissolved in 889 g of concentrated hydrochloric acid (37 percent) and the solution was subjected to distillation through a Vigreux column. After separating the first running which was free of antimony the pressure was reduced from 750 to 15 mm Hg and an intermediate fraction was collected in form of an azeotropic mixture which contained 24 g $SbCl_3$ in addition to water. Thereafter 389 g of antimony (III)-chloride distilled off at a temperature of 105° C. These solidified in the collection vessel to a white mass of crystals. The melting point of the product was 72.6° C.

The residue remaining in the distillation apparatus contained about 22 g $SbCl_3$. The intermediate product and the residue were recycled into the distillation and subjected to fractionation together with more antimony (III)-chloride solution. The amount of antimony recovered in this manner from the initial inactive catalyst was 97 percent.

EXAMPLE 2

For comparison, the process of Example 1 was repeated by omitting the removal of the fluoride ions. Thus, the aqueous solution containing the same amount of inactive catalyst as in Example 1 was treated with the same amount of potassium iodide and sulfur dioxide under otherwise identical conditions. After heating to 110° C an analysis was carried out and 59 g of Sb(V) was found to be present in the solution. This meant that only 64 percent of the Sb(V)-ions were reduced to Sb(III)-ions.

EXAMPLE 3

An aqueous solution of 1400 g weight containing 18.0 g Sb(III) and 77.5 g Sb(V) which had been purified from most of the fluorine as in Example 1 was reacted in batches, at room temperature and while stirring, with 181 g of sodium thiosulfate. The mixture was then maintained at boiling temperature for 15 minutes and the precipitated sulfur was filtered off.

The filtrate was reacted with 586 g of a 25% ammonia solution in the same manner as in Example 1. There was thus precipitated an antimony oxide which contained 89.4 g of Sb(III) and 1.3 g of Sb(V).

EXAMPLE 4

One thousand g of a liquid mixture of a still partly active antimony halide catalyst and halogenated hydrocarbons was reacted with water until the formed aqueous phase started to become turbid. The turbidity was eliminated by adding a few drops of hydrochloric acid. The heavier organic phase was then separated by shaking in a separator funnel. This phase was then again washed with a small amount of semiconcentrated hydrochloric acid. The washing solution was united with the aqueous phase. The weight of the combined solutions was 2,300 g. They contained 235 g Sb(III), 89 g Sb(V), 377 g Cl and 3.5 g F.

0.3 g of potassium iodide was then added to the solution and sulfur dioxide was introduced. The further processing was as in Example 1 except that the heating to boiling temperature was omitted. In order to precipitate the antimony (III)-oxide, 950 g of a 25 percent ammonia solution were used. The precipitated oxide contained only trivalent antimony (320 g). The yield relative to the initial antimony was almost 99 percent.

By solution in hydrochloric acid and distillation as in Example 1, 540 g of antimony (III)-chloride were obtained from the precipitate. The intermediate fraction and the final distillation residue contained a total of 57 g antimony (III)-chloride. The intermediate fraction and the residue were recycled together with fresh antimony (III)-chloride solution into the distillation phase. In this manner 98.5 percent of the initial antimony could be recovered from the spent catalyst.

It will be understood that each of the elements described above, or two or more together, may also find a useful application in other types of processes differing from the types described above.

While the invention has been illustrated and described as embodied in a process for regeneration of antimony halide catalysts, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the recovery of antimony halides as substantially pure antimony (III) chloride from a spent antimony halide catalyst that had been used in a process for the fluorination of a halogenated hydrocarbon with hydrogen fluoride which catalysts normally consist essentially of a mixture of antimony (III) and antimony (V) halides and include compounds which dissociate to yield fluoride ions and compounds which dissociate to yield ions of heavy metals, the said process comprising the following steps:
   a. dissolving the catalyst in water to form an aqueous acidic solution,
   b. adding such an amount of aqueous solution of ammonia to the said aqueous solution of spent catalyst that the solution becomes alkaline and antimony oxides precipitate therein,
   c. separating the precipited antimony oxides by filtration from the remaining solution,
   d. dissolving the thus-separated antimony oxides in a solution of hydrochloric acid, thereby forming a solution containing antimony chlorides,
   e. reducing the antimony (V) chloride in the said solution of antimony chlorides by adding to the said solution a reducing agent of the group consisting of sodium thiosulfate, sulfur dioxide together with a redox catalyst, and alkali-metal sulfites and alkali-metal hydrogen sulfites together with a redox catalyst, the said redox catalyst being a compound that dissociates to yield iodide ions, in such an amount that substantially all of the antimony (V) chloride in the solution is reduced to antimony (III) chloride, and
   f. heating the said solution to boiling, and in the case when sodium thiosulfate is used as a reducing agent in step e, separating therefrom by filtration the sulfur that is precipitated therein.

g. thereafter adding an aqueous solution of ammonia to the solution of antimony (III) chloride in such an amount as to precipitate the antimony (III) chloride as antimony (III) oxide or oxychloride,
   h. separating the resulting precipitate of antimony (III) oxide or oxychloride by filtration from the remaining solution,
   i. dissolving the separated precipitate of antimony (III) oxide or oxychloride in an aqueous solution of hydrochloric acid, thereby forming a solution containing antimony (III) chloride, and j. separating the antimony (III) chloride from the resulting solution by fractional distillation.

2. A process as defined in claim 1 in which the solution formed in step a is filtered to separate any water-insoluble substances before being subjected to further treatment in accordance with the successive following steps of the process.

3. A process as defined in claim 1 in which the reducing agent that is used in step e is sulfur dioxide in the presence of a redox catalyst which consists of a compound that dissociates to yield iodide ions.

4. A process as defined in claim 1 in which the reducing agent that is used in step e is an alkali-metal sulfite or alkali-metal hydrogen sulfite in the presence of a redox catalyst which consists of a compound that dissociates to yield iodide ions.

5. A process as defined in claim 3 in which the compound that dissociates to yield iodide ions is an alkali-metal iodide.

6. A process as defined in claim 3 in which the compound that dissociates to yield iodide ions is potassium iodide, which is present in an amount of at least 0.005 percent by weight of the solution.

7. A process as defined in claim 1 in which the reducing agent that is used in step e is sodium thiosulfate and the mixture is thereafter treated as specified in step f.

8. A process as defined in claim 1 in which the fractional distillation in step j is effected at a subatmospheric pressure.

9. A process as defined in claim 1 in which the precipitate of antimony oxides that is separated in step c is washed with water to remove any residual fluoride ions.

10. A process as defined in claim 1 in which the antimony (III) oxide or oxychloride that is precipitated in step h is washed with water containing ammonium sulfite having a hydrogen-ion concentration corresponding to a pH between 8.0 and 9.0.

11. A process as defined in claim 1 in which the spent catalyst that is subjected to treatment contains not more than 1 percent of fluoride ion and steps *b*, *c* and *d* of the process are omitted.

* * * * *